Dec. 13, 1938.    W. J. TOMKINS    2,140,121
CONVERTIBLE RAIL AND HIGHWAY VEHICLE
Filed March 7, 1935    3 Sheets-Sheet 1
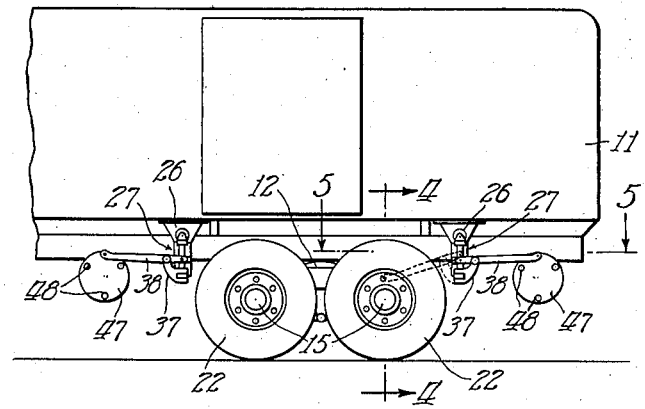
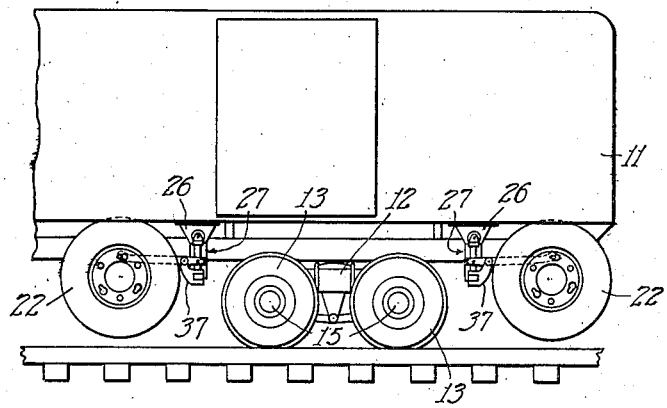
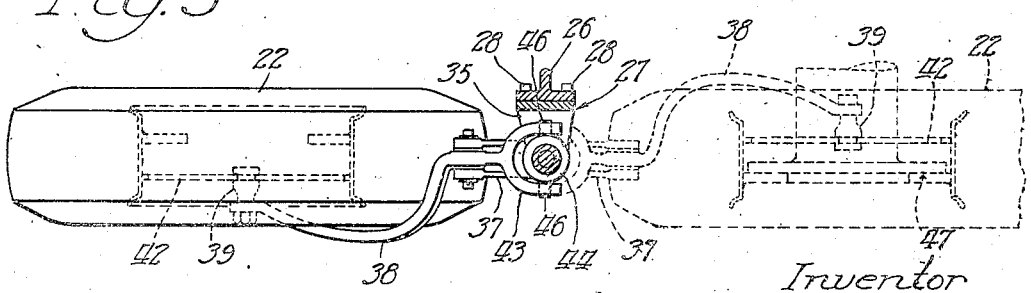
Witness
V. Siljander
Inventor
William J. Tomkins
By Hill & Hill

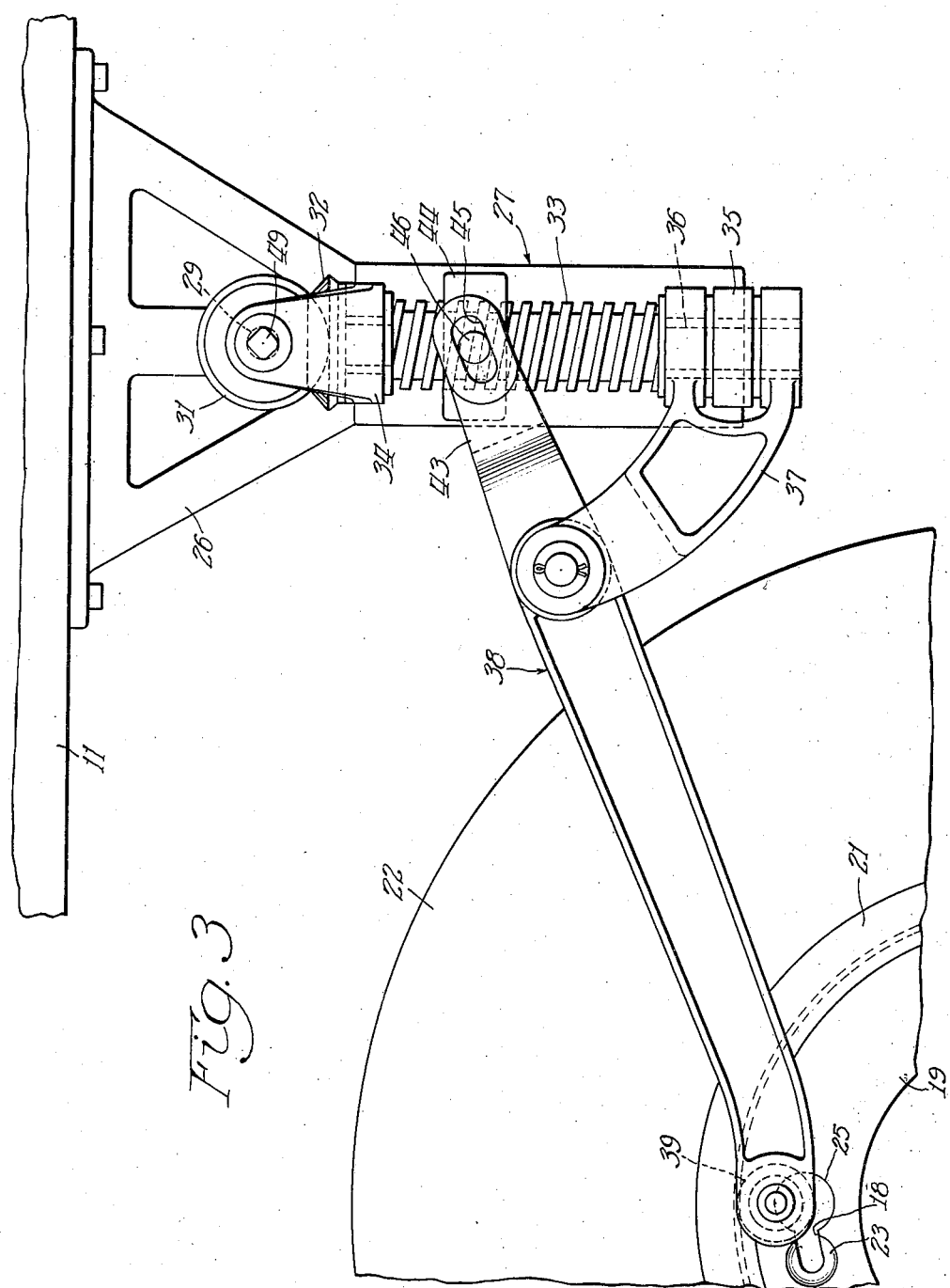

Dec. 13, 1938.　　　W. J. TOMKINS　　　2,140,121
CONVERTIBLE RAIL AND HIGHWAY VEHICLE
Filed March 7, 1935　　3 Sheets-Sheet 3

Witness
V. Siljander

Inventor
William J. Tomkins
By:
Hill & Hill
Attys

Patented Dec. 13, 1938

2,140,121

UNITED STATES PATENT OFFICE 2,140,121

CONVERTIBLE RAIL AND HIGHWAY VEHICLE

William J. Tomkins, Chicago, Ill.; Florence Tomkins executrix of said William J. Tomkins, deceased Application March 7, 1935, Serial No. 9,738

14 Claims. (Cl. 105—215)

This invention relates to vehicles, and particularly to vehicles adapted for use in both rail and highway transportation.

One object of the present invention is to provide a novel construction and arrangement whereby a vehicle may be readily and easily converted into a vehicle adapted for either rail or highway travel.

Another object of the invention is to provide a structure whereby the conversion from one type of vehicle to another may be made with a minimum of physical effort.

Another object of the invention is to provide a structure whereby a rim and tire therefor may be carried from operative to inoperative position and vice versa, and whereby the rim and tire may be automatically raised and lowered as desired merely by the movement of the rim and its carrier from one position to another.

A further object of the invention is to provide a structure whereby the rim and tire may be raised and lowered manually, if desired, for arranging the rim in proper relation to fastening means for securing the rim and tire in either operative or inoperative position.

A still further object of the invention is to improve devices of the character described in sundry details hereinafter referred to and particularly pointed out in the appended claims.

One embodiment of the present invention is shown for illustrative purposes in the accompanying drawings, in which:

Fig. 1 is a fragmentary elevational view of a rear portion of a vehicle illustrating the application of the present invention thereto, and showing the vehicle equipped with tires for highway or road travel;

Fig. 2 is a view similar to Fig. 1 showing the road tires mounted on the body of the vehicle in inoperative position, and the vehicle equipped for travel on railroad rails or the like;

Fig. 3 is an enlarged elevational view embodying features of the present invention;

Fig. 5 is an enlarged plan sectional view taken substantially as indicated by the line 5—5 of Fig. 1.

Figure 4:
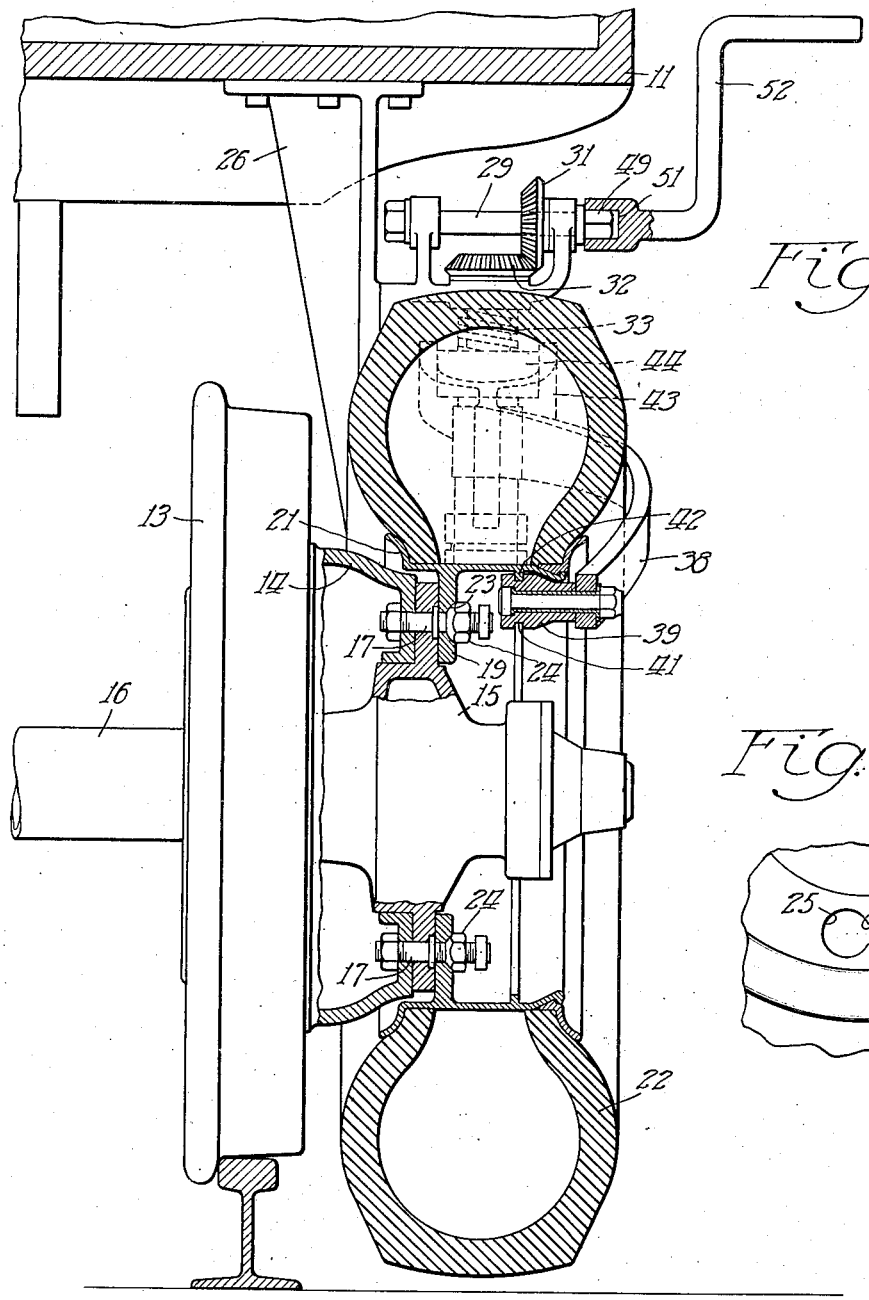
Fig. 4 is an enlarged transverse sectional elevational view through a portion of a vehicle body and wheel support therefor, and taken substantially as indicated by the line 4—4 of Fig. 1 illustrating the application of the present invention thereto.

The illustrative embodiment of the present invention is shown in the drawings as applied to a vehicle, such, for example, as a motor truck or the like having a body portion 11 provided with a truck or bolster 12 having flanged wheels 13 rotatably mounted thereon, the wheels 13 having hub portions 14 secured to a hub 15 mounted on an axle 16.

Figure 6:
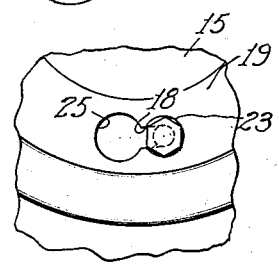
Fig. 6 is a fragmentary elevational view of a portion of the structure shown in Fig. 4, and illustrating the manner of securing the highway rim and tire to the rail wheel.

For securing the hub portion 14 to the hub 15, a plurality of bolts 17 are provided and are adapted to extend outwardly through elongated annularly extending apertures 18 (Fig. 6) formed in an annular flange 19 extending inwardly from a rim 21 adapted to support a road or highway tire 22 mounted thereon, one end of the elongated apertures 18 having a recess 23 associated therewith and adapted to receive a rounded portion of a nut 24 screw threaded on to the bolt 17 for securing the flange 19 against relative annular displacement with respect to the hub 15, the opposite end of the elongated aperture 18 being provided with an enlargement 25 through which the nut 24 may pass in a manner to permit convenient removal of the rim 21 and flange 19 from the hub 15 when the nuts 24 are loosened.

The present invention contemplates a structure whereby a vehicle may be readily adapted for travel on rails or highways, and to facilitate the removal of the rim 21 and the tire 22 from its position on the hub 15, a hangar 26 may be mounted on the body 11 of the vehicle, and a bracket indicated as a whole by the numeral 27 may be secured to the hanger by suitable means such as bolts 28 (Fig. 5), and rotatably mounted adjacent the upper end of the bracket 27 is a horizontally disposed shaft 29 having a bevel pinion 31 secured thereto and adapted to mesh with a pinion 32 secured to the upper end of a vertically disposed worm 33 mounted to rotate in upper and lower bearings 34 and 35, respectively, of the bracket 27.

Pivotally mounted adjacent the bearing 35 at the lower end of the bracket 27 by means of a reduced portion 36 of the worm 33 is an arm 37 extending upwardly and laterally from the bracket 27, and pivotally mounted intermediate its ends adjacent the upper end of the arm 37 is a carrier indicated as a whole by the numeral 38, one end of the carrier being provided with a roller 39 having a groove 41 formed therein adapted to receive an annular rib 42 formed on the inner face of the wheel rim 21, the opposite end of the carrier 38 being provided with a bifurcated or forked portion 43 adapted to receive a screw threaded collar 44 surrounding and operatively related to the worm 33 and adapted to be positioned between the legs of the fork, the legs being provided with elongated apertures 45 adapted to receive trunnions 46 formed on the collar 44 in a manner to retain the collar against unlimited rotation with respect to the forked end 43 of the carrier 38.

For supporting the wheel rim 21 and tire 22 in inoperative position on the body 11, a plurality of rim supporting members 47 are suitably mounted on the vehicle body 11 and provided with bolts 48 adapted to enter certain of the enlarged portions 25 of the elongated apertures 18 formed in the flange 19 in a manner to secure the rim 21 to the rim supporting members 47 in much the same manner as described with reference to the securing of the rim to the hub 15.

For manually rotating the worm 33, the shaft 29 may be provided adjacent its outer end with a squared portion 49 adapted to engage a socket 51 formed in one end of a hand crank 52 for rotating the shaft 29.

It is a well known fact that rims and tires employed for heavy traffic, as in the present type of vehicle, are extremely heavy, frequently weighing as much as two hundred seventy-five to three hundred pounds, and consequently considerable effort is ordinarily required to remove and replace such tires in position on the vehicle. It will be observed, however, that by use of the present invention, such changes in mounting a tire in operative or inoperative position may be accomplished readily and conveniently with a minimum expenditure of physical effort.

When it is desired to remove the rim 21 and tire 22, from the hub 15, for example, and position it on one of the rim supporting members 47, the carrier 38 may be swung to the position illustrated in Figs. 3 and 4, and in full lines in Fig. 5, in a manner to position the groove 41 of the roller 39 in engagement with the rib 42 on the rim 21, and by loosening the nuts 24 and shifting the flange 19 annularly with respect to the hub 15, the rim may be withdrawn from its mounting by passing the nuts 24 through the enlarged portions 25 of the apertures 18, the roller 39 in the meantime permitting of such rotation of the rim 21, thereafter by swinging the carrier 38 and the rim and tire supported thereon around the axial line of the worm 33, it will be noted that, by reason of the relation of the forked end 43 of the carrier 38 and the collar 44 with the worm 33, the tire and rim will be automatically elevated to position the enlarged portions 25 of the apertures 18 approximately in register with the bolts 48 of the rim supporting member 47 for securing the rim thereto as illustrated in Fig. 2, thereby permitting the use of the flanged wheels 13 for rail travel, and elevating the rim 21 and tire 22 sufficiently to avoid interference thereby with crossing frogs, switch frogs, or the like.

If, for any reason, the enlarged portions 25 of the apertures 18 should not register with the bolts 48, the proper registration may be obtained by a slight rotation of the shaft 29 and worm 33 by means of the crank 52 thereby positioning the rim 21 and tire 22 in inoperative position with relation to the vehicle, as shown in Fig. 2, and as indicated by dotted lines in Fig. 5.

It will be observed also that in order to replace the rim 21 and tire 22 in operative position on the hub 15, a reverse operation of the mechanism above described will be employed, after which the carriers 38 may be swung to their inoperative position as illustrated in Fig. 1, it being understood that similar mechanism is provided for the front wheels as well as for the rear wheels of the vehicle.

It will be observed from the foregoing description that the present invention provides a novel construction and arrangement whereby a vehicle of the character described may be readily and easily adapted for either rail or highway travel with a minimum expenditure of physical effort on the part of the operator, and that by reason of the mechanism employed, the rim and tire may be automatically raised and lowered as desired merely by the movement of the rim and its carrier from one position to another, and that, if desired, the rim and tire may be manually raised and lowered for arranging the rim in proper relation to its fastening means for securing the rim and tire in operative or inoperative position.

Obviously, the present invention is not limited to the precise construction and arrangement shown and described, as the same may be variously modified. Moreover, all the features of the present invention need not be used conjointly, as the same may be used to advantage in variously different combinations and sub-combinations.

What I claim as new and desire to secure by Letters Patent is:

1. In a vehicle having rail and road wheels adapted to be mounted thereon, a rim supporting member on the body of the vehicle, a rim and tire carrier pivotally mounted on the body of the vehicle between said rail wheel and said rim supporting member, said carrier being adapted to engage the rim of said road wheel for supporting said rim while the latter is being moved to and from said supporting member and into operative and inoperative positions with respect to the vehicle, and means rotatably mounted with respect to said body and operatively related to said carrier for raising and lowering the rim supported thereon as the said rim is moved toward and from said supporting member.

2. In a vehicle having rail and road wheels adapted to be mounted thereon, a rim supporting member on the body of the vehicle, a rim and tire carrier pivotally mounted with respect to the body of the vehicle, said carrier being adapted to engage the rim of one of said wheels for supporting said rim while the latter is being moved to and from said supporting member and into operative and inoperative positions with respect to the vehicle, and a train of gearing rotatably mounted on said body and operatively related to said carrier for raising and lowering the rim supported thereon as the said rim is moved toward and from said supporting member.

3. In a vehicle having rail and road wheels adapted to be mounted thereon, a rim supporting member on the body of the vehicle, a rim and tire carrier pivotally mounted with respect to the body of the vehicle, said carrier being adapted to engage the rim of one of said wheels for supporting said rim while the latter is being moved to and from said supporting member and into operative and inoperative positions with respect to the vehicle, and a train of gearing mounted on said body and including a worm and worm wheel operatively related to said carrier for raising and lowering the rim supported thereon as the said rim is moved toward and from the said supporting member.

4. In a vehicle having a flanged wheel mounted thereon, a road tire and rim therefor adapted to be secured to said wheel, a rim supporting member on the body of the vehicle adapted to receive said rim, a bracket mounted on the vehicle body, an arm pivotally mounted on said bracket, a rim carrier pivotally mounted on said arm for supporting said rim and tire, and means operatively related to said carrier for raising and lowering said road tire and rim while being moved between their respective positions on said flanged wheel and on said rim supporting member.

5. In a vehicle having a flanged wheel mounted thereon, a road tire and rim therefor adapted to be removably secured to said wheel, a rim supporting member on the body of the vehicle adapted to receive said rim, a bracket mounted on the vehicle body between said flanged wheel and said supporting member, an arm pivotally mounted on said bracket, a rim carrier pivotally mounted on said arm for supporting said rim and tire, and means supported by said bracket and operatively related to said carrier for raising and lowering said road tire and rim while the latter are being moved between their operative positions on said flange wheel and their inoperative positions on said rim supporting member.

6. In a vehicle having a flanged wheel mounted thereon, a road tire and rim therefor adapted to be removably secured to said wheel, a rim supporting member on the body of the vehicle adapted to receive said rim, a bracket mounted on the vehicle body between said flanged wheel and said supporting member, an arm pivotally mounted on said bracket, a rim and tire carrier pivotally mounted on said arm, a roller on the free end of said carrier adapted to engage said tire rim, and manually operated means supported by said bracket and operatively related to said carrier for raising and lowering the roller at the free end of said carrier and the road tire and rim mounted thereon while the latter are being moved between their operative positions on said flanged wheel and their inoperative positions on said supporting member.

7. In a vehicle having a flanged wheel mounted thereon, a road tire and rim therefor adapted to be removably secured to said wheel, a rim supporting member on the body of the vehicle adapted to receive said rim, a bracket mounted on the vehicle body between said flanged wheel and said supporting member, an arm pivotally mounted on said bracket, a rim and tire carrier pivotally mounted intermediate its ends on said arm, a grooved roller on the free end of said carrier adapted to engage said tire rim, and manually operated means including a worm and worm wheel supported on said bracket and operatively related to said carrier for raising and lowering the roller at the free end of the carrier and the road tire and rim mounted thereon while the latter are being moved between their operative positions on said flanged wheel and their inoperative positions on said rim supporting member.

8. In a vehicle having a flanged wheel rotatably mounted thereon, a road tire and rim therefor, means for removably securing said rim to said wheel, a supporting member on the body of the vehicle adapted to receive said rim, a bracket mounted on the vehicle body between said wheel and said rim supporting member, an arm pivotally mounted on said bracket, a rim carrier pivotally mounted intermediate its ends on said arm for supporting said rim and tire adjacent one end of said carrier, a worm rotatably mounted in said bracket, a threaded collar mounted adjacent the other end of said carrier and operatively related to said worm, and manually actuated means for rotating said worm to move the collar longitudinally thereof.

9. In a vehicle having a flanged wheel rotatably mounted thereon, a road tire and rim therefor, means for removably securing said rim to said wheel, a supporting member on the body of the vehicle adapted to receive said rim, a bracket mounted on the vehicle body between said wheel and said rim supporting member, an arm pivotally mounted on said bracket, a rim carrier pivotally mounted intermediate its ends on said arm for supporting said rim and tire adjacent one end of said carrier, a worm rotatably mounted in said bracket, a threaded collar pivotally mounted adjacent the other end of said carrier and operatively related to said worm, and a manually actuated gear train operatively related to said worm for rotating the worm and moving said collar longitudinally thereof in a manner to rock said carrier about its pivotal connection with said arm to raise and lower the rim and tire supporting end of the carrier.

10. In a vehicle having a plurality of flanged wheels rotatably mounted thereon, road tires and rims therefor, means for removably securing said rims, respectively, to said wheels, a plurality of supporting members on the body of the vehicle adapted, respectively, to receive said rims, a plurality of brackets mounted on the vehicle body between the respective wheels and adjacent rim supporting members, an arm pivotally mounted on each of said brackets, rim carriers pivotally mounted intermediate their ends on each of said arms for supporting said rims and tires adjacent one end of each of said carriers, a worm rotatably mounted in each of said brackets, threaded collars pivotally mounted adjacent the other end of the respective carriers and operatively related to the respective worms, and manually actuated means for rotating said worms to move said collars longitudinally thereof in a manner to rock said carriers about their pivotal connections with said arms to raise and lower the rim and tire supporting ends of the carriers.

11. A vehicle for rail and road travel comprising a chassis, flanged rail wheels therefor, road wheels detachably secured to the rail wheels, and a demounting arm pivoted to the chassis and angularly movable into engagement with the road wheel for swinging it away from the rail wheel after it has been detached from the latter.

12. A vehicle for rail and road travel comprising a chassis, flanged rail wheels therefor, road wheels detachably secured to the rail wheels, and a demounting arm pivotally connected to the chassis and angularly movable into engagement with a road wheel for simultaneously swinging and lifting the road wheel and conveying it beneath the chassis.

13. In combination with a vehicle having a rail wheel and a road wheel detachably connected to the rail wheel in concentric relation, a demounting arm for removing the road wheel, a spiral spindle for pivotally connecting the arm to the vehicle so that it may swing horizontally toward the wheel, and means at the free end of the arm for separably engaging the road wheel.

14. In a vehicle having a flanged wheel rotatably mounted thereon, a road tire and rim therefor, means for removably securing said tire and rim to said wheel, said means comprising a plurality of laterally extending annularly spaced screw-threaded bolts rigidly mounted on said wheel, an inwardly extending annular flange on said rim having a plurality of elongated annularly extending and annularly spaced apertures formed therein adapted to register with and to receive said bolts, said annular flange having recesses formed therein adjacent one end of the respective apertures, and screw-threaded nuts on the respective bolts and having rounded portions adapted to engage said recesses, each of said apertures having an enlarged portion adjacent their ends opposite said recesses for permitting the passage of said nuts through said enlarged portions without removing the nuts from said bolts.

WILLIAM J. TOMKINS.